United States Patent
Hermans et al.

(10) Patent No.: US 7,512,220 B2
(45) Date of Patent: Mar. 31, 2009

(54) DSL MODEM AND A METHOD OF PROVIDING OPERATING POWER FOR SAME

(75) Inventors: Daran G. Hermans, San Jose, CA (US); Patrick L. Corder, Martinez, CA (US); Kevin Braun, Pleasanton, CA (US)

(73) Assignee: Tut Systems, Inc., Lake Oswego, OR (US)

( * ) Notice: Subject to any disclaimer, the term of this patent is extended or adjusted under 35 U.S.C. 154(b) by 492 days.

(21) Appl. No.: 11/291,333

(22) Filed: Nov. 30, 2005

(65) Prior Publication Data

US 2007/0121924 A1    May 31, 2007

(51) Int. Cl.
*H04M 11/00* (2006.01)
(52) U.S. Cl. ............... 379/93.28; 379/93.36; 379/93.05
(58) Field of Classification Search ............... 379/93.28, 379/93.05, 93.06, 93.36, 399.01, 399.02, 379/435
See application file for complete search history.

(56) References Cited

U.S. PATENT DOCUMENTS

| | | | |
|---|---|---|---|
| 6,549,616 B1 | 4/2003 | Binder | |
| 6,690,677 B1 | 2/2004 | Binder | |
| 6,757,368 B2 | 6/2004 | Binder | |
| 2002/0044646 A1* | 4/2002 | Keenum et al. | 379/435 |
| 2005/0117740 A1* | 6/2005 | Rabenko et al. | 379/413 |

* cited by examiner

*Primary Examiner*—Stella L Woo (57) ABSTRACT

An xDSL modem apparatus for installation on a telephone jack wall plate. The apparatus includes a port for transmitting and receiving carrier waves, a low-pass filtering means, a high-pass filtering means, and a band-pass filtering means. The low-pass filtering means isolates low-frequency component of a received composite carrier wave below a first frequency and transmitting the isolated low-frequency component of the composite carrier wave. The high-pass filtering means isolates a high-frequency component of the composite carrier wave above a second frequency. The band-pass filtering means isolates a power component of the composite carrier wave, the power component being in a frequency range between the first and second frequencies. The apparatus also includes an xDSL modem for demodulating the high-frequency component of the composite carrier wave in order to recover a computer readable bitstream and for modulating a high-frequency carrier wave with a received computer readable bitstream. The xDSL modem transmits the demodulated computer readable bitstream and the modulated carrier wave. The apparatus also includes a means for utilizing the power component of the composite carrier wave to provide operating power for the xDSL modem.

13 Claims, 5 Drawing Sheets

DSL MODEM AND A METHOD OF PROVIDING OPERATING POWER FOR SAME

BACKGROUND

A multiple dwelling unit (MDU) is a structure, such as a hotel, apartment building, dormitory, or hospital, that provides individual accommodations and associated services to a number of occupants. The occupants may be relatively long term, as in an apartment building or dormitory, or short term, as in a hotel.

An operator of an MDU must provide access to certain essential services to the MDU's occupants, such as electricity, water, telephone, etc.

Different types of MDUs will use different technology to provide internal telephone service. An apartment building may provide a direct connection, typically via an unshielded twisted pair (UTP) of copper wires, from the local public switched telephone network (PSTN) to each unit, whereas a hotel may provide a connection, also via a UTP, from each unit to a private branch exchange (PBX). In a PBX based MDU, each telephone extension within the MDU connects to a central piece of PBX equipment and the PBX connects calls between the extensions, such as between a hotel room and the front desk. A number of trunk lines connect from the PBX to the local PSTN for making and receiving calls external to the MDU.

The local PSTN, or the PBX in conjunction with the local PSTN, provides analog voice communication and DC operating power for basic telephone services (POTS—Plain Old Telephone Service) over a UTP to each unit of an MDU. Depending on the quality and length of the UTP, the upper limit of the UTP's usable bandwidth can be upwards of 10 MHz, while POTS only utilizes the 0-4 kHz frequency band.

The operators of many MDUs also provide, or wish to provide, high-speed internet access (HSIA) to the MDU's occupants. A convenient method for providing HSIA to the units of an MDU is a version of digital subscriber loop (xDSL—x referring to any version of the DSL standard) technology. A key advantage of using xDSL technology is that it uses the existing telephone lines to provide HSIA without interfering with conventional telephone services.

The MDU as a whole may connect to the internet through an xDSL circuit connected to a local loop data circuit via a dedicated transmission line, such as a T1 line. On the MDU premises, multiple units may access the internet by connecting to the xDSL circuit, for instance embodied within a DSL access multiplexer (DSLAM). The DSLAM is connected to the MDU's internal phone lines between the PBX equipment and the units of the MDU. For network traffic entering the MDU, the DSLAM receives a high-bandwidth digital data signal from the local loop data circuit, demultiplexes the data signal according to the desired destination of the data (creating multiple lower bandwidth digital data signals), and modulates the digital data signals with a high-frequency analog waveform. The DSLAM then transmits the modulated digital data signal on to the appropriate unit's phone line, at higher frequencies than the conventional analog phone services, typically 30 kHz and above.

In the unit, an xDSL modem uses high-pass filter circuitry to isolate the high-frequency modulated data signals being transmitted over the phone line while any phone jacks not connected to the xDSL modem will use passive low-pass filter circuitry to isolate the lower frequency POTS signals, such as voice communication and dial tone signals and the DC operating power. The above process is reversed for outgoing network traffic. Typically, an xDSL modem receives DC operating power from a transformer/rectifier that converts AC power received from a 110-120 V 60 Hz wall outlet to low voltage DC power.

Operators of some MDUs such as hotels have found several frequently occurring barriers to successfully providing convenient and reliable xDSL based HSIA to the MDU's occupants. Frequently, components of the customer premises equipment, such as the xDSL modem's AC power supply or the xDSL modem's connection to the unit's phone line, can become disconnected, for instance by a hotel's cleaning staff or by the previous occupant of the unit. In addition, as most xDSL modems are small and operate independently from other equipment, theft of the xDSL modem and/or its AC power supply is also a problem. While these problems are not technically complicated to correct on a case-by-case basis, avoiding these issues entirely would clearly be preferable.

One possible deterrent to theft of the xDSL modem is to physically secure the xDSL modem to the MDU itself, for instance to a wall of the unit or to a large piece of furniture. However, the secured xDSL modem will still need be connected to the unit's phone line and to a power source and these connections may still inadvertently become unplugged causing an unnecessary service outage. If the connection between the phone line and the xDSL modem were inaccessible to occupants of the unit, the problem of disconnection of the phone line would be avoided. If operating power for the secured xDSL modem could also be provided in a way that is not readily accessible to an occupant of the unit, the problems of theft of the modem's AC power supply and the inadvertent disconnection of the AC power supply would also be avoided.

It is therefore desirable to provide an xDSL modem having means for connecting to an MDU unit's telephone line and means for providing operating power to the xDSL modem that are inaccessible to an occupant of the unit. It is also desirable that the design of the xDSL modem discourage theft. Further, it is also desirable that installation of the xDSL modem and any related components be simple and not require any replacement, removal or complex reconfiguration of existing telephone wiring.

SUMMARY OF THE INVENTION

In accordance with a first aspect of the invention there is provided an xDSL modem apparatus comprising a port for transmitting and receiving carrier waves, a low-pass filtering means for isolating a low-frequency component of a received composite carrier wave below a first frequency and transmitting the isolated low-frequency component of the composite carrier wave, a high-pass filtering means for isolating a high-frequency component of the composite carrier wave above a second frequency, a band-pass filtering means for isolating a power component of the composite carrier wave, the power component being in a frequency range between the first and second frequencies, an xDSL modem for demodulating the high-frequency component of the composite carrier wave and recovering a computer readable bitstream therefrom and transmitting the computer readable bitstream, and for modulating a high-frequency carrier wave with a received computer readable bitstream and transmitting the modulated carrier wave, and a means for utilizing the power component of the composite carrier wave to provide operating power for the DSL modem.

In accordance with a second aspect of the invention there is provided cable interface device for combining an alternating current power carrier, a first carrier component in a first frequency band and a second carrier component in a second frequency band into a composite carrier wave and injecting the composite carrier wave onto a first transmission medium having a resonant frequency between said first and second frequency bands, the first component being audio and the second component being data, the interface device comprising a first input for connection to a second transmission medium, the second transmission medium being for delivering the first component to the first transmission medium, a second input for connection to a third transmission medium, the third transmission medium being for delivering the second component to the first transmission medium, an output for connection to the first transmission medium for transmitting the composite carrier wave, a power carrier generator connected to the output, and a feedback path between the power carrier generator and the first transmission medium, wherein, in operation, the power carrier generator generates an AC power carrier wave oscillating at the resonant frequency of the first transmission medium and delivers the AC power carrier wave to the first transmission medium.

In accordance with a third aspect of the invention there is provided a method of providing electrical power to a primary device, the primary device being electrically connected to a remote device via a transmission medium, the transmission medium having a first section terminating at the remote device and a second section terminating at the primary device, and the method comprising (a) determining a resonant frequency of the second section of the transmission medium, (b) generating an oscillating electrical power carrier at the resonant frequency of the second section, (c) injecting the power carrier into the transmission medium at a point of intersection between the first and second sections, and (d) receiving the power carrier at the primary device.

In accordance with a fourth aspect of the invention, there is provided a method of installing an xDSL modem on to a phone jack wall plate, the xDSL modem being housed in an external casing, the xDSL modem having a telephone line connection means accessible from a rear side of the casing, the phone jack wall plate having an unpopulated phone jack and being secured to a structure by a screw having a threaded portion and a head, the method comprising loosening the screw securing the wall plate to the structure, positioning an adapter plate over the wall plate, the adapter plate having a frame surrounding a recess and a rearward wall, the rearward wall having a primary opening and at least one keyhole opening, the at least one keyhole opening having a lower section and a upper section, the lower section being larger than the upper section, wherein the adapter plate is positioned over the wall plate such that the rearward wall is in contact with the wall plate, the head of the screw passes through the lower section of the at least one keyhole opening, and the second phone jack is accessible via the primary opening, sliding the adapter plate downwards until the adapter plate is supported by the threaded portion of the screw via the upper section of the keyhole opening, tightening the screw, thereby securing the adapter plate to the wall plate, connecting the xDSL modem to the phone jack via the telephone line connection means, and engaging the wall plate attachment casing with the adapter plate.

BRIEF DESCRIPTION OF DRAWINGS

For a better understanding of the invention, and to show how the same may be carried into effect, reference will now be made, by way of example, to the accompanying drawings, in which.

DETAILED DESCRIPTION

The following description relates to two components, each embodying aspects of the present invention and intended to be installed at separate locations within an MDU. The first component, a cable interface device, is intended to be installed in a service room, utility closet, or similar location within an MDU. The second component, a telephone jack wall plate attachment, is intended to be installed in an individual unit of the MDU. For clarity in the following description, the term upstream is intended to refer to any portion of a transmission medium, component, or sub-component oriented away from the individual unit of the MDU and the term downstream is intended to refer to any portion of a transmission medium, component, or sub-component oriented towards the individual unit of the MDU. No limitation on the direction of signal propagation is intended with the use of the terms upstream and downstream. All of the functions of the embodiments of the present invention described below operate independently of the direction of signal traffic.

Figure 1:
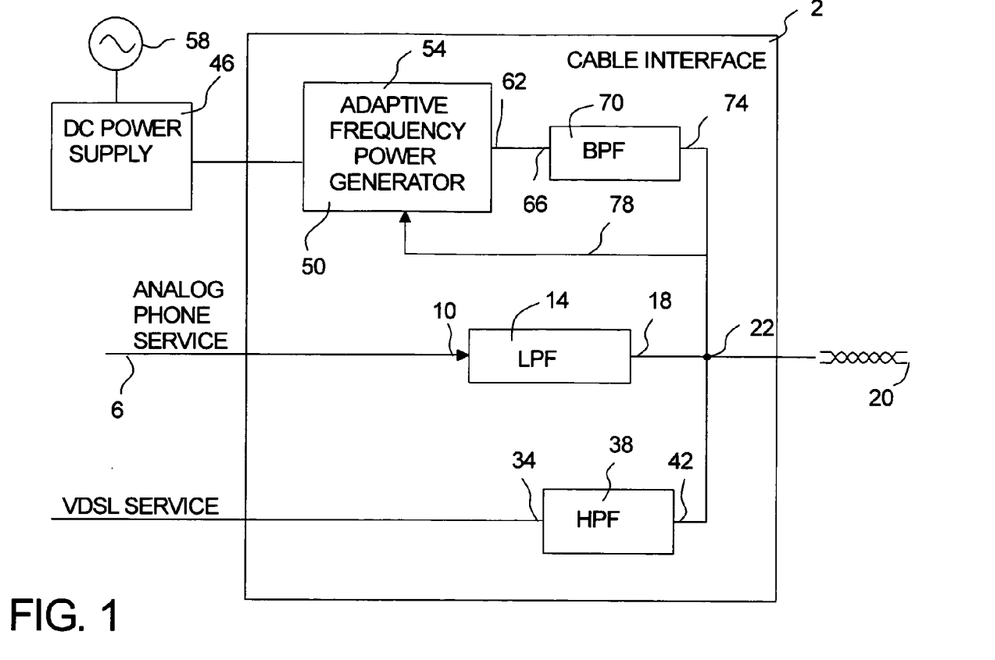
FIG. 1 shows a block diagram of a power injection circuit embodying an aspect of the present invention.

FIG. 1 shows the internal functional blocks of a cable interface device (CID) 2 embodying an aspect of the present invention. An upstream analog phone line 6 is connected to an upstream side 10 of a low-pass filter circuit 14 having a cutoff frequency $f_{lp,1}$. A downstream side 18 of the low-pass filter circuit 14 is connected to an intermediate transmission medium 20, such as a UTP, at a common node 22. An upstream xDSL service line 26 is connected to an upstream side 34 of a high-pass filter circuit 38 having a cutoff frequency $f_{hp,1}$. A downstream side 42 of the high-pass filter circuit 38 is connected to the intermediate transmission medium 20 at the common node 22.

A DC power supply 46 provides electrical power to an input side 50 of an adaptive frequency power generator (AFPG) 54. The DC power supply 46 contains a transformer/rectifier circuit (not shown) supplied by an AC power supply 58, such as a conventional 110-220 V 60 Hz wall outlet. The AFPG 54 converts the electrical power received from the DC power supply 46 to an AC power carrier with a frequency of $f_0$ and transmits the AC power carrier from an output side 62 of the AFPG 54. The output side of the AFPG 62 is connected to an input side 66 of a band-pass filter 70 having a lower cutoff frequency $f_{lc,1}$ and an upper cutoff frequency $f_{uc,1}$. An output side 74 of the band-pass filter is connected to the intermediate transmission 20 medium at the common node 22. The AFPG 54 is also connected to the intermediate transmission medium 20 through a feedback path 78. The bandpass filter's cutoff frequencies are selected to allow a range of frequencies, corresponding to expected values of $f_0$, to propagate through the filter but to block frequency values that would be allowed to pass by either the low-pass filter 14 or the high-pass filter 38.

The low-pass filter 14 and the high-pass filter 38 act to isolate components of a waveform received from the intermediate transmission medium 20 based on the frequency of the components. The low-pass filter 14 will pass frequency components less than $f_{lp,1}$ to the upstream analog phone line 6 and will block higher frequency components. The high-pass filter 34 will pass frequency components greater than $f_{hp,1}$ to the xDSL service line and will block lower frequency components. The band-pass filter 70 acts to block frequency components outside the frequency band between $f_{bp,lc,1}$ and $f_{bp,uc,1}$, i.e. the components allowed to pass by the low-pass and high pass filters. The band-pass filter's cutoff frequencies are selected to allow a range of frequencies, corresponding to expected values of $f_0$, to propagate from the AFPG 54, through the band-pass filter and on to the intermediate transmission medium 20 but to block the AFPG from receiving low and high frequency signals from the intermediate transmission medium 20.

A transmission medium such as a UTP has certain inherent physical characteristics that present an impedance to an AC carrier wave, primarily capacitance and inductance. The power loss due to the capacitive and inductive characteristics of the transmission medium can be calculated by the equation:

$$P = \frac{V^2}{X_C + X_L}$$

where V equals the peak voltage of carrier signal, $X_c$ equals the capacitive reactance of the transmission medium, $X_L$ equals the inductive reactance of the transmission medium, and P equals the power loss. The values of the capacitive and inductive reactance are both a function of the physical properties of the transmission medium and the frequency of the AC carrier wave. The capacitive reactance is inversely proportional to frequency, and thus as the frequency of the carrier increases, the capacitive reactance will decrease and the associated power losses will increase. The inductive reactance is directly proportional to the frequency of the AC carrier, and thus as the frequency of a carrier decreases, the inductive reactance also decreases and the associated power losses will increase. It is well understood by those skilled in the art that the reactive power loss in an AC carrier on a transmission medium is minimized when the capacitive reactance equals the inductive reactance. The frequency at which this occurs is known as the transmission medium's resonant frequency $f_r$.

In practical applications, the intermediate transmission medium's resonant frequency will vary depending on the physical characteristics of the medium, such as wire gauge, twists per inch, shielding and length. Referring again to FIG. 1, in order to minimize reactive power losses, the frequency $f_0$ of the AC power carrier generated by the AFPG 54 should be as close to the intermediate transmission medium's resonant frequency $f_r$ as possible.

The AFPG 54 includes an oscillator that receives feedback from its load. The feedback causes the oscillator's operating frequency to be a function of the capacitive and inductive components of the oscillator's load, and will, after a brief period upon power up, stabilize at the load's resonant frequency $f_r$. Therefore, the AC power carrier's frequency $f_0$ will equal the resonant frequency of the intermediate transmission medium, which in turn will depend on cable configuration (length, cable type, bridge taps, etc.), and the reactive power loss of the AC power carrier will be minimized. In a preferred embodiment of the invention, the oscillator is a Royer oscillator. Royer oscillators are commonly used in flat panel display technology and are well understood by those skilled in the art (see U.S. Pat. No. 6,633,138 and Jim Williams, "A Fourth Generation of LCD Backlight Technology" Linear Technology, Application Note #65, pages 32-36 and 119).

As is described below, in operation the AFPG 54 will be electrically connected to a power conversion block (114, FIG. 2) containing a transformer that presents an inductive load to the AFPG 54. The corresponding capacitive load largely depends on the length of the intermediate transmission medium. If the length of the intermediate transmission medium 20 is less than some minimum amount (e.g. 50 feet), its capacitive load, even combined with any capacitive load of the band-pass filter 70, may result in a resonant frequency $f_r$ that falls outside of the frequency band of the band-pass filter 70. Therefore, it may be desirable to include a bias capacitor circuit (not shown) at the downstream side 62 of the AFPG 54 to balance the inductive load of the power conversion block.

Figure 2:
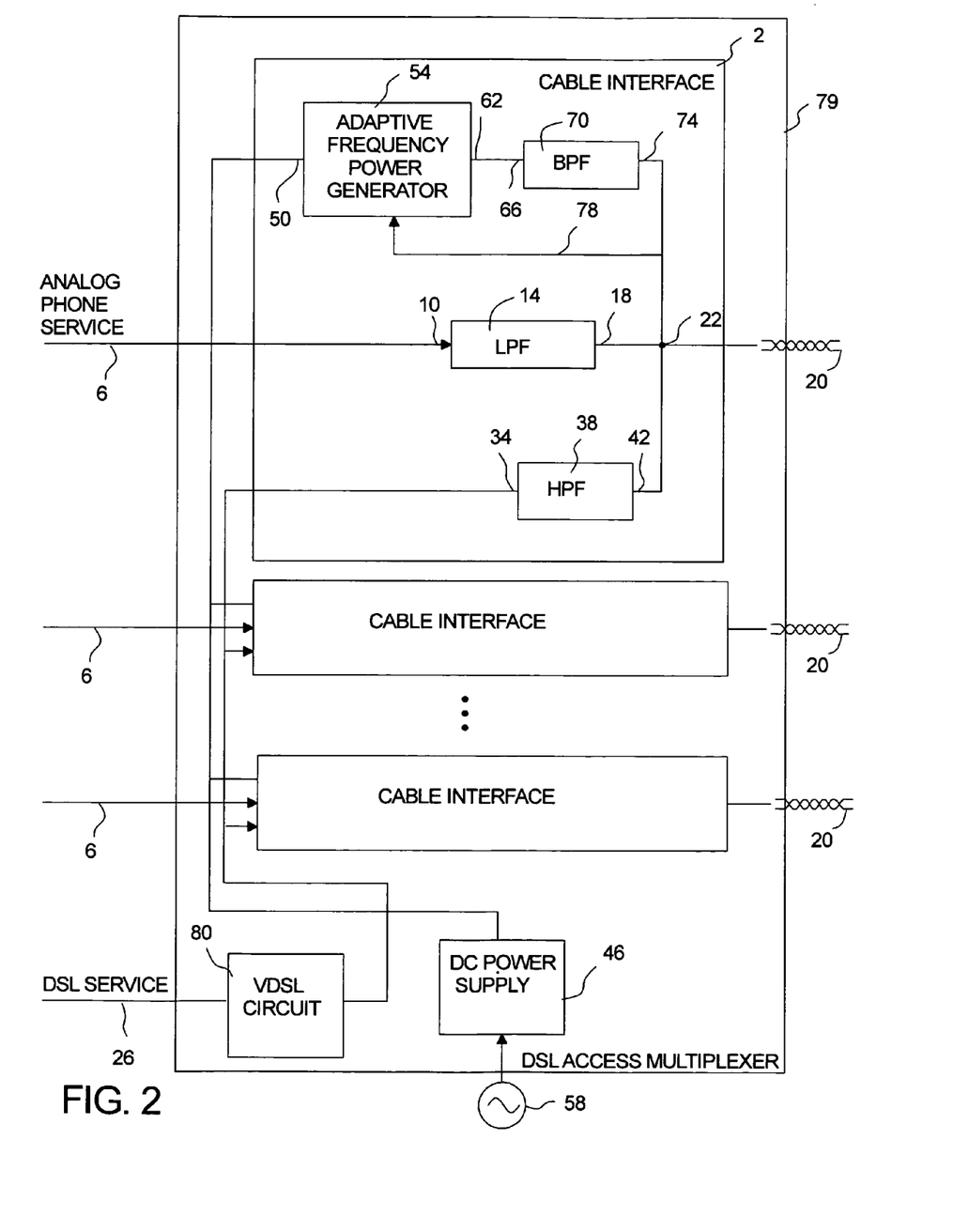
FIG. 2 shows a block diagram of a DSLAM containing multiple power injection circuits embodying an aspect of the present invention.

Referring to FIG. 2, in a preferred embodiment of an aspect of the present invention, multiple CIDs are incorporated into a DSLAM 79. An upstream analog phone line 6 is routed to each CID 2 within the DSLAM 79 from a source (not shown), such as a PBX. An xDSL service line 26, such as a T1 line, is routed to the DSLAM from a local loop data circuit (not shown) and is connected to an xDSL circuit 80. The xDSL circuit 80 connects to each CID 2. Each CID 2 connects to an intermediate transmission medium 20, which is connected in turn to a phone jack (not shown) of an individual unit of the MDU.

Figure 3:
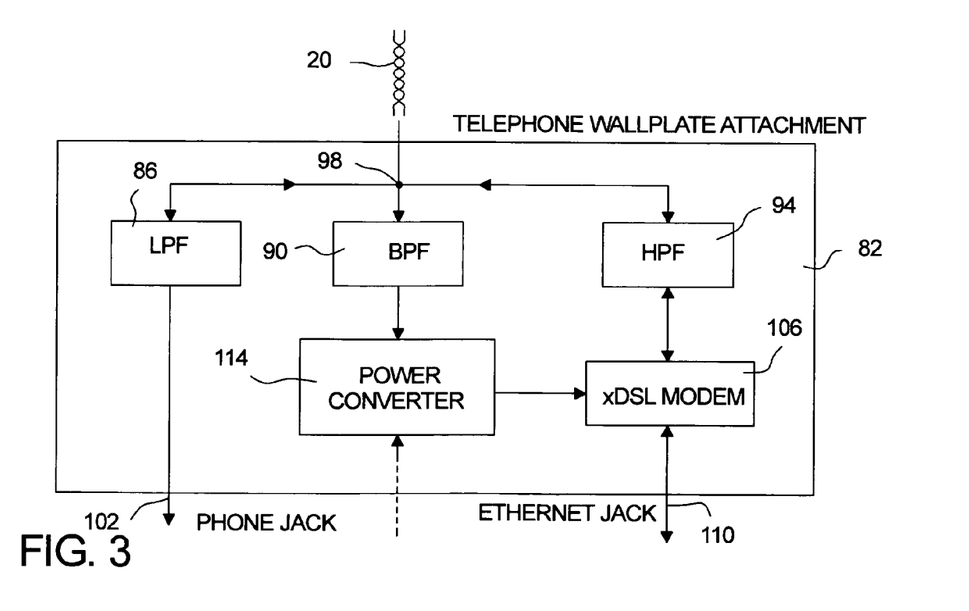
FIG. 3 shows a block diagram of a phone jack wall plate xDSL modem attachment embodying an aspect of the present invention.

FIG. 3 shows the internal functional blocks of a telephone jack wall plate attachment 82 embodying an aspect of the present invention. The telephone jack wall plate attachment 82 includes a low-pass filter 86 having a cutoff frequency $f_{lp,2}$, a band-pass filter 90 having a lower cutoff frequency $f_{lc,2}$ (where $f_{lc,2} > f_{lp,2}$) and an upper cutoff frequency $f_{uc,2}$, and a high-pass filter 94 having a cutoff frequency $f_{hp,2}$ (where $f_{hp,2} > f_{uc,2}$). The intermediate transmission medium 20 is connected to all three filter circuits at a common node 98. The low-pass filter 86 is connected to a downstream analog voice signal I/O 102 (such as a conventional telephone jack). The high-pass filter 94 is connected to a customer premises equipment (CPE) xDSL modem 106. The CPE xDSL modem 106 is connected to a downstream digital data I/O 110 (such as a conventional Ethernet jack). The band-pass filter 90 is connected to a power conversion block 114. The power conversion block 114 may include a transformer and a rectifier (not shown).

The three filters 86, 90, 94 act to isolate components of a composite carrier wave received from the intermediate transmission medium 20. The low-pass filter 86 will pass frequency components less than $f_{lp,2}$ to the downstream analog voice signal I/O 102 and will block higher frequency components. The band-pass filter 94 will pass frequency components in the frequency band between $f_{bp,lc,2}$ and $f_{bp,uc,2}$ to the power conversion block 114 and will block components outside this frequency band. The high-pass filter 94 will pass frequency components greater than $f_{hp,2}$ to the xDSL CPE modem 106 and will block lower frequency components.

In operation, the CID 2 receives a low-frequency analog carrier wave from the upstream analog phone line 6 and a high-frequency analog carrier wave, modulated with digital data, from the upstream xDSL service line 26. The low-frequency carrier wave and the high-frequency carrier wave propagate through the low-pass filter 14 and the high-pass filter 38 respectively and then on to the intermediate transmission medium 20. The CID 2 injects the AC power carrier generated by the AFPG 54 onto the intermediate transmission medium. The three carriers combine to form a composite carrier waveform carrying analog voice data, A/C power and modulated digital data. Each component of the composite carrier wave operates in its own, non-overlapping, frequency range.

When the composite carrier enters the phone jack wall plate attachment 82, the three filter circuits isolate the components of the composite carrier. The low-pass filter blocks 86 all the components of the composite carrier except the low-frequency voice signal component. The low-frequency voice signal component passes through the low-pass filter 86 to the phone jack 102. The band-pass filter 90 blocks all the components of the composite carrier except the AC power carrier originally injected by the CID 2 which passes through the band-pass filter 90 to the power conversion block 114. The power conversion block 114 converts the AC power carrier to DC operating power usable by the xDSL CPE modem 106. The high-pass filter 94 blocks all the components of the composite carrier except the high-frequency modulated digital data component which passes through the high-pass filter 94 to the xDSL CPE modem 106. The xDSL CPE modem 106 uses the DC operating power received from the power conversion block 114 to translate the high-frequency modulated digital data component into a packetized digital signal in a way determined by the standard of the particular version of DSL technology being implemented by the xDSL CPE modem 106.

The ability of the CID 2 to self-tune to the AC power carrier to the resonant frequency of the intermediate transmission medium 20 allows for greater flexibility in installation as the AFPG 54 does not have to be configured based on the physical characteristics of the individual intermediate transmission medium (wire gauge, twists per inch, shielding, length, etc).

To enable HSIA to be provided to a unit or units of an MDU using an embodiment of the present invention, a CID 2 must be installed at a convenient location in the MDU, for instance near a junction box, and a wall plate attachment 82 must be installed in the desired unit(s).

Figure 4:
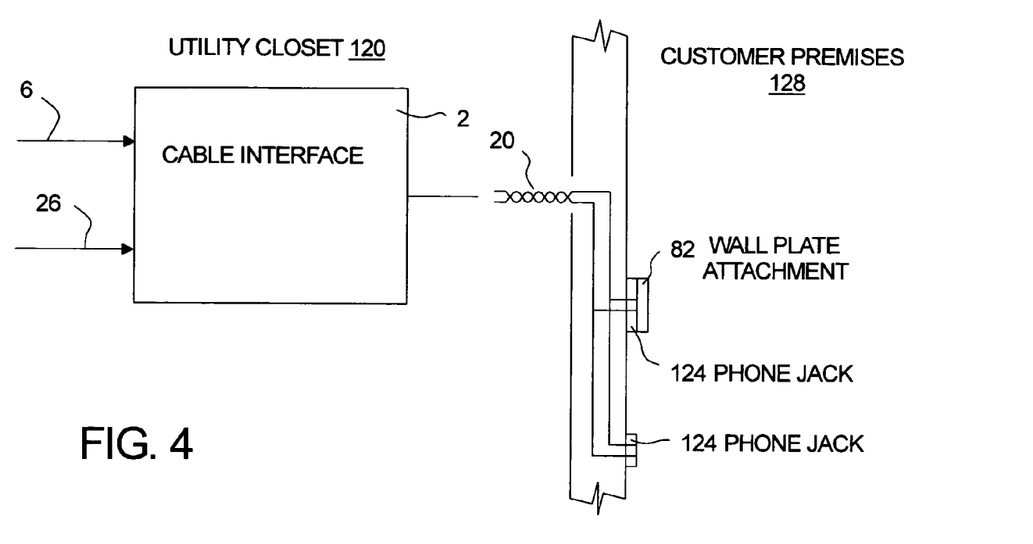
FIG. 4 shows a partial block diagram of a multiple dwelling unit in which an embodiment of the present invention is installed.

Referring to FIG. 4, the CID 2 is installed at an access point 120, such as a utility closet or service room, in an MDU. The phone line and xDSL service line are divided into upstream sections 6, 26 from the access point to upstream equipment (not shown), such as an xDSL circuit in the case of the xDSL service line or a central PBX device in the case of the analog phone line, and an intermediate section 20 from the phone line access point to a desired telephone jack 124 in a unit 128 of the MDU. The upstream section of the phone line 6 is connected to the upstream side (10, FIG. 1) of the low-pass filter (14, FIG. 1) of the CID 2 and the intermediate section 20 is connected to the common node (22, FIG. 1) of the three CID filters. The telephone jack wall plate attachment 82 is attached to the desired phone jack 124 whereby the intermediate section 20 is also connected to the common node (98, FIG. 3) of the three wall plate attachment filters.

Figure 5:
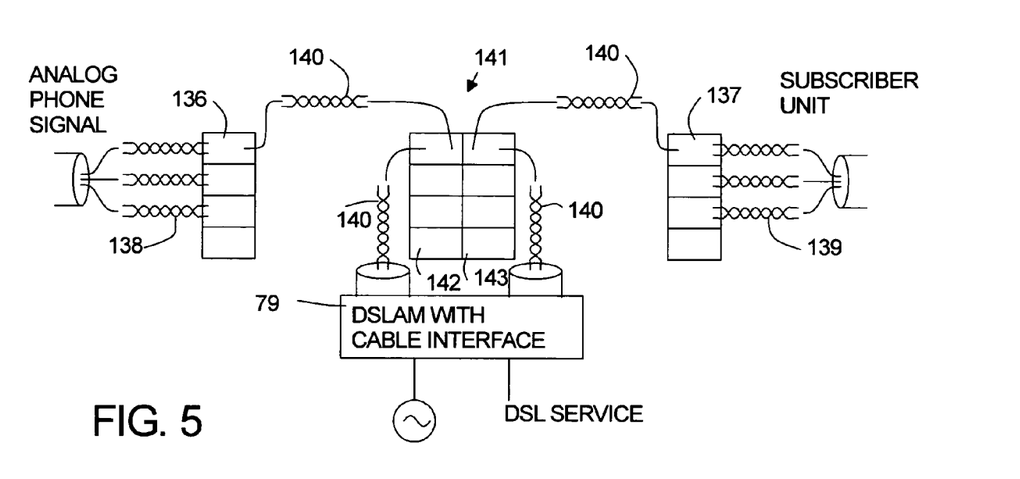
FIG. 5 shows an enlarged schematic view of a telephone line junction box embedded in a wall.

Referring to FIG. 5, in an installation process embodying an aspect of the present invention, a DSLAM 79 containing multiple CIDs may be installed in a utility room of the MDU containing a system block 136 and a station block 137. Telephone lines 138 from a source (not shown), such as a PBX are terminated at the system block 136 and the telephone lines 139 from the units of the MDU (not shown) are terminated at the station block 137. The system block 136 and the station block 137 are connected together by jumper wires (not shown). To install the DSLAM 79, an installer disconnects the jumper wires and installs a new termination block 140 between the system and station blocks. For each telephone line, the installer installs jumpers 141 from the system block 136 to a system side 142 of the new termination block 140, from the system side 142 to the DSLAM 79, from the DSLAM 79 to a station side 143 of the new termination block, and from the station side 143 to the station block 138. A conventional 110/240 VAC power outlet may provide operating power to the DSLAM 79. In operation, the waveform entering the DSLAM from the PBX to a unit of the MDU contains only the low-frequency POTS signal for the unit. Upon exiting the DSLAM, the waveform is a composite carrier containing the low-frequency POTS signal, a high-frequency modulated digital data signal, and a power carrier.

Figure 6:
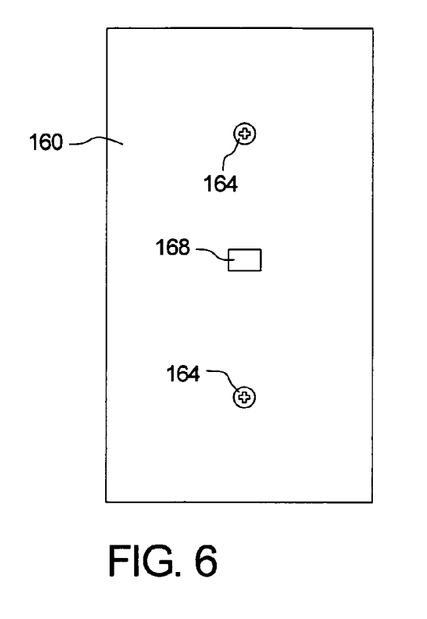
FIG. 6 shows an enlarged schematic view of a conventional telephone jack wall plate.
Figure 7:
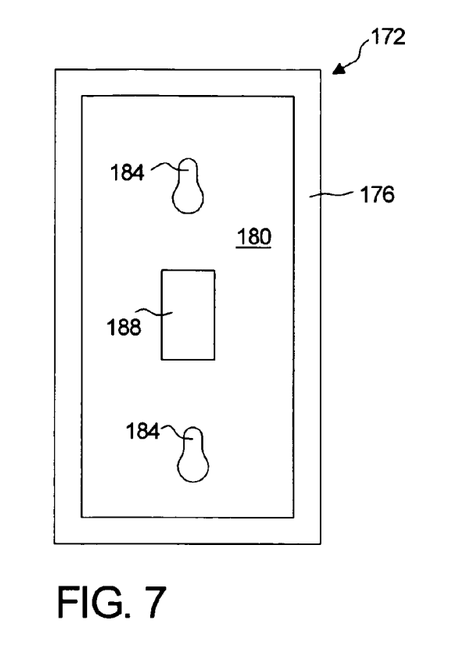
FIG. 7 shows an enlarged schematic view of an adapter plate used in an installation process embodying an aspect of the present invention.
Figure 8:
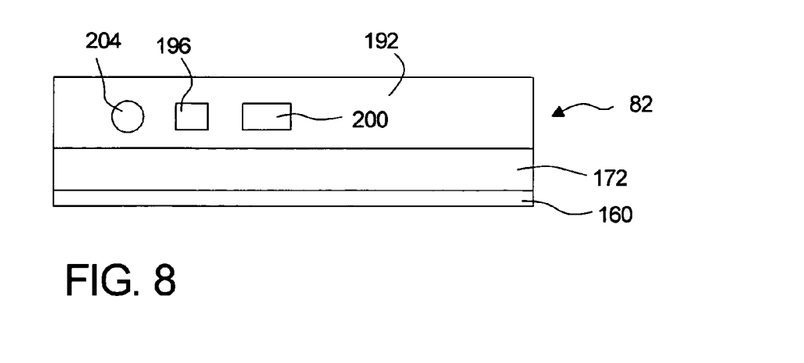
FIG. 8 shows a side schematic view of the conventional telephone jack wall plate, the adapter plate, and an xDSL modem attachment embodying an aspect of the present invention.

Referring to FIGS. 6-8, a wall plate attachment 82 embodying the present invention may be quickly installed on an existing telephone jack wall plate 160 in a unit of an MDU. As shown in FIG. 8, the wall plate attachment 82 is housed in a casing 192. The casing includes an RJ11 phone jack 196, connected internally to the downstream analog voice data I/O (102, FIG. 1) and a T1 Ethernet jack 200, connected internally to the downstream digital data I/O (110, FIG. 3). The wall plate attachment casing also includes a DC power input 204. The DC power input 204 enables the option of providing operating power to the wall plate attachment's DSL modem in the event no CID is installed upstream of the telephone jack wall plate. The frame 176 of the adapter plate 172 and the casing 192 are formed to engage with a snap fit. As is conventional, the telephone jack wall plate 160 is attached by screws 164 to an outlet box (not shown) that is mounted behind the wall of the unit. An RJ11 jack 168 that is connected to the telephone line is mounted in the wall plate 160.

First, an installer removes any existing telephone plug (not shown) from the jack 168 in the wall plate 160. Then, the installer loosens the screws 164 holding the wall plate 160 to the junction box, exposing the screws' shanks. The installer need not completely remove the screws, remove the wall plate from the junction box, or disconnect the jack from the phone line. The installer then places an adapter plate 172 over the wall plate 160. As shown in FIG. 7, the adapter plate 172 comprises a rectangular frame 176 and a rear wall 180. The rear wall 180 is formed with two keyhole openings 184 and with a larger or primary opening 188. The installer should position the adapter plate 172 such that the telephone jack 168 is accessible through the adapter plate's primary opening 188 and such that the screw heads pass through the wider portion of the two keyhole openings 184. The installer then slides the adapter plate 172 downwards until it is supported by the screws 164. Next, the installer should tighten the screws, thereby securing the adapter plate 172 to the wall plate 160.

After installing the adapter plate 172, the installer should then insert one plug of an RJ11 jumper into a recessed jack (not shown) on a rear side of the wall plate attachment casing 192 and insert the second plug of the RJ11 jumper into the jack 168 in the wall plate through the adapter plate's primary opening 188. Finally, the installer presses the wall plate attachment casing into the adapter plate, forming a snap fit.

The present invention therefore provides an xDSL modem having means for connecting to an MDU unit's telephone line and means for providing operating power to the xDSL modem, both of which are inaccessible to an occupant of the unit. Because the xDSL modem is designed to receive operating power over the phone line, the xDSL modem is essentially useless outside of the MDU and there is therefore little point in stealing it. Further, installation of the xDSL modem is simple and does not require any replacement, removal or complex reconfiguration of existing telephone wiring.

It will be appreciated that the invention is not restricted to the particular embodiment that has been described, and that variations may be made therein without departing from the scope of the invention as defined in the appended claims and equivalents thereof. For example, although the invention has been described as using a Royer oscillator and with reference to a single unit of an MDU, any oscillator circuit having the capability to find and oscillate at the circuit's resonant frequency could be used in the AFPG and multiple CIDs could be integrated into a single unit serving multiple units of the MDU without departing from the scope of the invention. Also, the invention is not restricted to use in an MDU, as that term is defined above. Unless the context indicates otherwise, a reference in a claim to the number of instances of an element, be it a reference to one instance or more than one instance, requires at least the stated number of instances but is not intended to exclude from the scope of the claim a structure having more instances of that element than stated.

The invention is claimed:

1. An xDSL modem apparatus comprising:
    a port for transmitting and receiving carrier waves via a transmission medium,
    a low-pass filtering means for isolating a low-frequency component of a received composite carrier wave below a first frequency and transmitting the isolated low frequency component of the composite carrier wave,
    a high-pass filtering means for isolating a high-frequency component of the composite carrier wave above a second frequency,
    a band-pass filtering means for isolating a power component of the composite carrier wave, the power component having a resonant frequency of the transmission medium and being in a frequency range between the first and second frequencies,
    an xDSL modem for demodulating the high-frequency component of the composite carrier wave and recovering a computer readable bitstream therefrom and transmitting the computer readable bitstream, and for modulating a high-frequency carrier wave with a received computer readable bitstream and transmitting the modulated carrier wave, and
    a means for utilizing the power component of the composite carrier wave to provide operating power for the DSL modem.

2. An xDSL modem apparatus according to claim 1, wherein the DSL modem is housed in a wall plate attachment for installation on a phone jack wall plate.

3. An xDSL modem apparatus according to claim 1, wherein the low-frequency component has a frequency range of 0 Hz to 5 kHz.

4. An xDSL modem apparatus according to claim 1, wherein the high-frequency component has a frequency range of all frequencies greater than or equal to 900 kHz.

5. An xDSL modem apparatus according to claim 1, wherein the power component has a frequency range of 20 kHz to 1001 kHz.

6. A cable interface device for combining an alternating current power carrier, a first carrier component in a first frequency band and a second carrier component in a second frequency band into a composite carrier wave and injecting the composite carrier wave onto a first transmission medium having a resonant frequency between said first and second frequency bands, the first component being audio and the second component being data, the interface device comprising:
    a first input for connection to a second transmission medium, the second transmission medium being for delivering the first component to the first transmission medium,
    a second input for connection to a third transmission medium, the third transmission medium being for delivering the second component to the first transmission medium,
    an output for connection to the first transmission medium for transmitting the composite carrier wave,
    a power carrier generator connected to the output, and
    a feedback path between the power carrier generator and the first transmission medium,
    wherein, in operation, the power carrier generator generates an AC power carrier wave oscillating at the resonant frequency of the first transmission medium and delivers the AC power carrier wave to the first transmission medium.

7. A cable interface device according to claim 6, wherein the power carrier generator detects the resonant frequency of the first transmission medium.

8. A cable interface device according to claim 6 wherein the first and second transmission mediums are single two-wire pairs.

9. A method of providing electrical power to a primary device, the primary device being electrically connected to a remote device via a transmission medium, the transmission medium having a first section terminating at the remote device and a second section terminating at the primary device, and the method comprising:
    (a) determining a resonant frequency of the second section of the transmission medium,
    (b) generating an oscillating electrical power carrier at the resonant frequency of the second section,
    (c) injecting the power carrier into the transmission medium at a point of intersection between the first and second sections, and
    (d) receiving the power carrier at the primary device.

10. A method according to claim 9, wherein the primary device and the remote device are in electrical communication with each another via the transmission medium, the electrical communication including a first component being communicated in a first frequency range below the resonant frequency of the second section and a second component being communicated at a second frequency range above the resonant frequency of the second section, and the method comprises, between steps (c) and (d), the steps of isolating the power carrier from the first and second components and converting the power carrier into a form usable by the primary device.

11. A method according to claim 9, wherein the transmission medium is a single two-wire pair.

12. A method according to claim 11, wherein the single two-wire pair is part of a phone line.

13. A method according to claim 9, wherein the primary device is a DSL modem.

* * * * *

UNITED STATES PATENT AND TRADEMARK OFFICE
CERTIFICATE OF CORRECTION

PATENT NO. : 7,512,220 B2  Page 1 of 1
APPLICATION NO. : 11/291333
DATED : March 31, 2009
INVENTOR(S) : Hermans et al.

It is certified that error appears in the above-identified patent and that said Letters Patent is hereby corrected as shown below:

IN THE SPECIFICATION

In Column 3, Line 16, delete "power." and insert -- power --, therefor.

IN THE CLAIMS

In Column 9, Line 60, in Claim 5, delete "1001 kHz." and insert -- 100 kHz. --, therefor.

Signed and Sealed this

Fifteenth Day of June, 2010

David J. Kappos
*Director of the United States Patent and Trademark Office*